United States Patent
Miura et al.

(10) Patent No.: US 6,742,329 B2
(45) Date of Patent: Jun. 1, 2004

(54) EXHAUST EMISSION CONTROL SYSTEM OF DIESEL ENGINE

(75) Inventors: Manabu Miura, Kanagawa (JP); Takashi Shirakawa, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/375,259

(22) Filed: Feb. 28, 2003

(65) Prior Publication Data

US 2003/0182932 A1 Oct. 2, 2003

(30) Foreign Application Priority Data

Mar. 28, 2002 (JP) .......................... 2002-092459

(51) Int. Cl.$^7$ ................................................. F01N 3/00
(52) U.S. Cl. ............................ 60/285; 60/274; 60/284; 60/297; 60/301; 60/311
(58) Field of Search ................... 60/274, 284, 295, 60/297, 301, 311, 285

(56) References Cited

U.S. PATENT DOCUMENTS

| | | | | |
|---|---|---|---|---|
| 5,713,198 A | * | 2/1998 | Aoki et al. | 60/277 |
| 5,746,989 A | * | 5/1998 | Murachi et al. | 423/213.7 |
| 5,974,791 A | * | 11/1999 | Hirota et al. | 60/276 |
| 6,167,696 B1 | * | 1/2001 | Maaseidvaag et al. | 60/274 |
| 6,233,927 B1 | * | 5/2001 | Hirota et al. | 60/297 |
| 6,293,096 B1 | * | 9/2001 | Khair et al. | 60/286 |
| 6,304,815 B1 | * | 10/2001 | Moraal et al. | 701/115 |
| 6,484,495 B2 | * | 11/2002 | Minami | 60/288 |
| 6,490,857 B2 | * | 12/2002 | Sasaki | 60/278 |
| 6,539,709 B2 | * | 4/2003 | Kubo et al. | 60/301 |
| 6,651,424 B1 | * | 11/2003 | Twigg | 60/289 |

FOREIGN PATENT DOCUMENTS

| | | |
|---|---|---|
| EP | 1 158 143 A2 | 11/2001 |
| JP | 7-189654 A | 7/1995 |
| WO | WO 98/40611 A1 | 9/1998 |
| WO | WO 00/53903 A1 | 9/2000 |

* cited by examiner

Primary Examiner—Thomas Denion
Assistant Examiner—Diem Tran
(74) Attorney, Agent, or Firm—Foley & Lardner LLP

(57) ABSTRACT

A HC adsorption type three-way catalytic converter is arranged in an exhaust gas passage of a diesel engine at a position upstream of a diesel particulate filter or a NOx trapping catalytic converter. Upon need of reactivation of the diesel particulate filter or NOx trapping catalytic converter under cold operation of the engine, a control unit carries out lowering an excess air ratio of the exhaust gas of the engine when the temperature of the catalyst bed of the three-way catalytic converter is lower than or equal to a first predetermined temperature (viz., oxidization activation temperature); raising the excess air ratio of the exhaust gas when the temperature of the catalyst bed of the three-way catalytic converter is higher than the first predetermined temperature but lower than or equal to a second predetermined temperature (viz., three-way catalyst activation temperature); and lowering the excess air ratio of the exhaust gas until the temperature of the exhaust gas purifying device becomes to a third predetermined temperature (viz., reactivation assuring temperature) when the temperature of the catalyst bed of the three-way catalytic converter is higher than the second predetermined temperature.

10 Claims, 6 Drawing Sheets

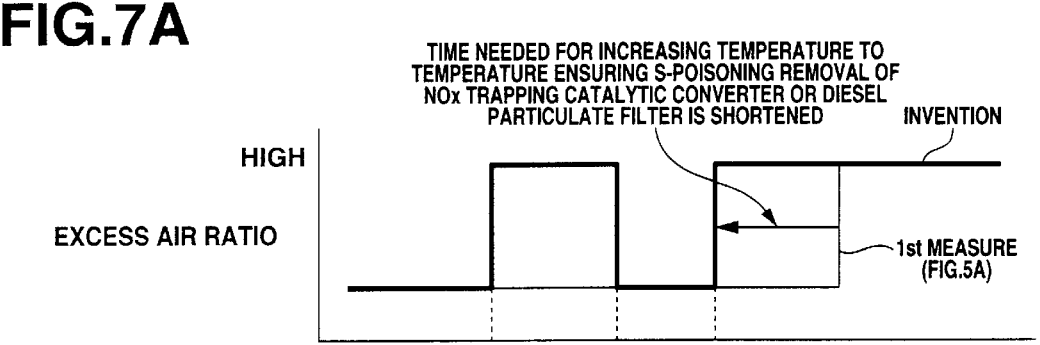
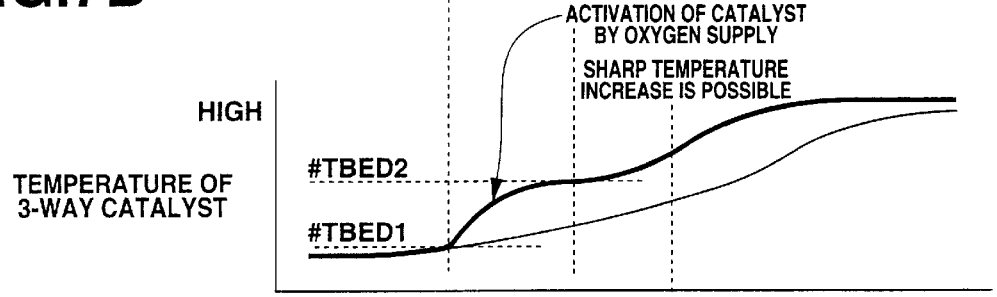
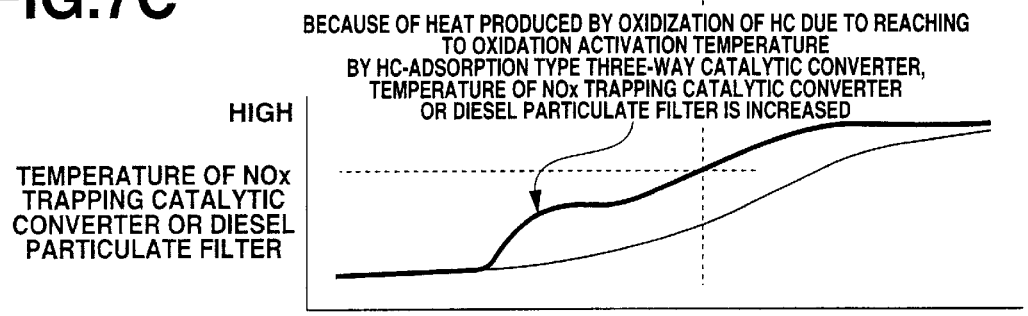
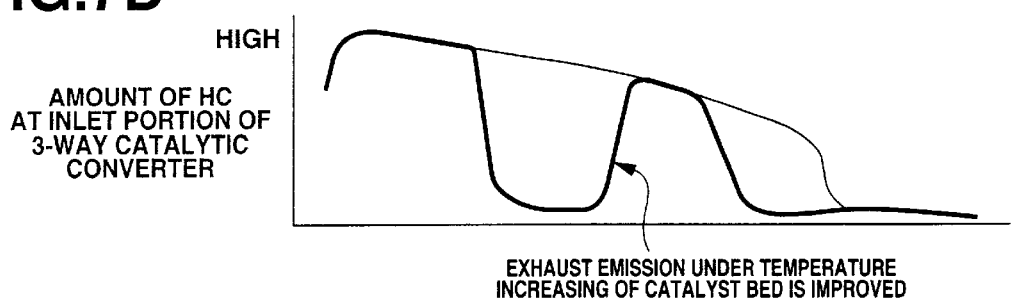
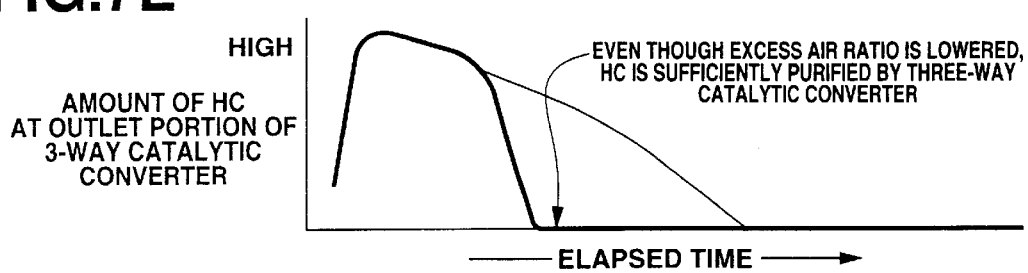

EXHAUST EMISSION CONTROL SYSTEM OF DIESEL ENGINE

BACKGROUND OF THE INVENTION

1. Field of the Invention

The present invention relates in general to exhaust emission control systems of an internal combustion engine, and more particularly to the exhaust emission control systems of a type that is suitable for a diesel engine.

2. Description of Related Art

An exhaust emission control system for a diesel engine is shown in Laid-open Japanese Patent Application (Tokkaihei) 7-189654. For collecting particulates (PM: particulate matter) in exhaust gas from the diesel engine, the known control system has a diesel particulate filter (DPF) with a catalyst, that is installed in an exhaust gas passage extending from the engine. Under operation of the engine, a differential pressure between upstream and downstream positions of the diesel particulate filter is monitored and, when the differential pressure exceeds a given degree, a throttle valve of the engine is so controlled as to lower an excess air ratio of the exhaust gas. With this, the exhaust gas temperature becomes increased thereby to burn off the particulates left in the filter.

SUMMARY OF THE INVENTION

After studying the above-mentioned known control system, the following facts have been revealed by the applicants, that are latently possessed by the known control system and appear when the diesel engine is under cold operation. That is, under cold operation, the cooling water and cylinder walls of the engine show a low temperature, and thus fuel for the engine fails to have a satisfied vaporization. Thus, if, for the purpose of increasing the exhaust gas temperature, lowering of the excess air ratio (that is, enriching the air/fuel mixture) is carried out when the engine is still cold, the exhaust gas from the engine is forced to have a large amount of hydrocarbon (HC) as compared with a case wherein the engine is sufficiently warmed. Furthermore, under such cold operation of the engine, a filter bed of the diesel particulate filter (DPF) has a low temperature, and thus until the time when the filter bed shows a sufficient temperature for a normal oxidization function of the filter, a large amount of hydrocarbon (HC) is inevitably emitted to the open air without being purified. These phenomena will be well understood when referring to the time charts of FIGS. 5A, 5B, 5C, 5D and 5E that show various data with respect to an elapsed time.

In order to solve the above-mentioned undesirable phenomena, a measure may be thought out wherein until the diesel particulate filter (DPF) shows its sufficient oxidization function, raising of exhaust gas temperature is carried out while controlling the amount of hydrocarbon (HC) exhausted from the engine. However, if lowering of the excess air ratio is made small, raising of exhaust gas temperature becomes small. In this case, the time needed until the diesel particular filter (DPF) shows its satisfied oxidization function is increased. Thus, also in this measure, a satisfied reduction of hydrocarbon (HC) emitted to the open air is not expected. This measure will be well understood when referring to the time charts of FIGS. 6A, 6B, 6C, 6D and 6E that show various data with respect to an elapsed time. For comparison, the data in case of the control system of Laid-open Japanese Patent Application 7-189654 are also shown in the time charts by thinner curves.

Although the above description is directed to the undesired phenomenon that takes place when, with the engine being under cold operation, the excess air ratio is lowered for increasing the exhaust gas temperature to reactivate the diesel particulate filter (DPF), viz., to remove the particulates (PM) in the filter, similar undesired phenomenon would take place in a case wherein, with the engine being under cold operation, the exhaust gas temperature is increased to reactivate a NOx trapping catalytic converter, viz., to remove S-poisoning from the catalyst of the converter.

It is therefore an object of the present invention to provide an exhaust emission control system of a diesel engine, which can increase the exhaust gas temperature without deteriorating the quality of the exhaust gas from the engine at the time when, with the engine being under cold operation, reactivation of the diesel particulate filter (DPF) and/or reactivation of the NOx trapping catalytic converter is needed.

According to a first aspect of the present invention, there is provided an exhaust emission control system of a diesel engine, which comprises an exhaust gas purifying device arranged in an exhaust gas passage extending from the engine, the exhaust gas purifying device having at least one of two functions, one function being a function of trapping particulate matter (PM) of the exhaust gas flowing in the exhaust gas passage and the other function being a function of trapping nitrogen oxides (NOx) in the exhaust gas when the exhaust gas shows a higher excess air ratio and reducing the trapped nitrogen oxides (NOx) to purify the same when the exhaust gas shows a lower excess air ratio; a three-way catalytic converter arranged in the exhaust gas passage upstream of the exhaust gas purifying device, the converter purifying hydrocarbon (HC), carbon monoxide (CO) and nitrogen oxides (NOx) in the exhaust gas when the excess air ratio of the exhaust gas is approximately 1 (one); a hydrocarbon adsorbing/releasing member arranged in the exhaust gas passage upstream of the three-way catalytic converter, the member selectively adsorbing thereon hydrocarbon in the exhaust gas and releasing the adsorbed hydrocarbon into the exhaust gas in accordance with a temperature of a catalyst bed of the three-way catalytic converter; and a control unit which is configured to carry out, upon need of reactivation of the exhaust gas purifying device under cold operation of the engine, lowering the excess air ratio of the exhaust gas when the temperature of the catalyst bed of the three-way catalytic converter is lower than or equal to a first predetermined temperature; raising the excess air ratio of the exhaust gas when the temperature of the catalyst bed of the three-way catalytic converter is higher than the first predetermined temperature but lower than or equal to a second predetermined temperature; and lowering the excess air ratio of the exhaust gas until the temperature of the exhaust gas purifying device becomes to a third predetermined temperature when the temperature of the catalyst bed of the three-way catalytic converter is higher than the second predetermined temperature.

According to a second aspect of the present invention, there is provided a method of controlling an exhaust emission control system of a diesel engine, the control system comprising an exhaust gas purifying device arranged in an exhaust gas passage extending from the engine, the exhaust gas purifying device having at least one of two functions, one function being a function of trapping particulate matter (PM) of the exhaust gas flowing in the exhaust gas passage and the other function being a function of trapping nitrogen oxides (NOx) in the exhaust gas when the exhaust gas shows a higher excess air ratio and reducing the trapped nitrogen oxides (NOx) to purify the same when the exhaust gas shows a lower excess air ratio; a three-way catalytic converter arranged in the exhaust gas passage upstream of the exhaust gas purifying device, the converter purifying hydrocarbon (HC), carbon monoxide (CO) and nitrogen oxides (NOx) in the exhaust gas when the excess air ratio of the exhaust gas is approximately 1 (one); and a hydrocarbon adsorbing/ releasing member arranged in the exhaust gas passage upstream of the three-way catalytic converter, the member selectively adsorbing thereon hydrocarbon in the exhaust gas and releasing the adsorbed hydrocarbon into the exhaust gas in accordance with a temperature of a catalyst bed of the three-way catalytic converter. The method comprising, upon need of reactivation of the exhaust gas purifying device under cold operation of the engine, lowering the excess air ratio of the exhaust gas when the temperature of the catalyst bed of the three-way catalytic converter is lower than or equal to a first predetermined temperature; raising the excess air ratio of the exhaust gas when the temperature of the catalyst bed of the three-way catalytic converter is higher than the first predetermined temperature but lower than or equal to a second predetermined temperature; and lowering the excess air ratio of the exhaust gas until the temperature of the exhaust gas purifying device becomes to a third predetermined temperature when the temperature of the catalyst bed of the three-way catalytic converter is higher than the second predetermined temperature.

BRIEF DESCRIPTION OF THE DRAWINGS

FIGS. 7A to 7E are time charts showing various data provided in accordance with the present invention.

DETAILED DESCRIPTION OF THE INVENTION

In the following, the present invention will be described in detail with reference to the accompanying drawings.

Figure 1:
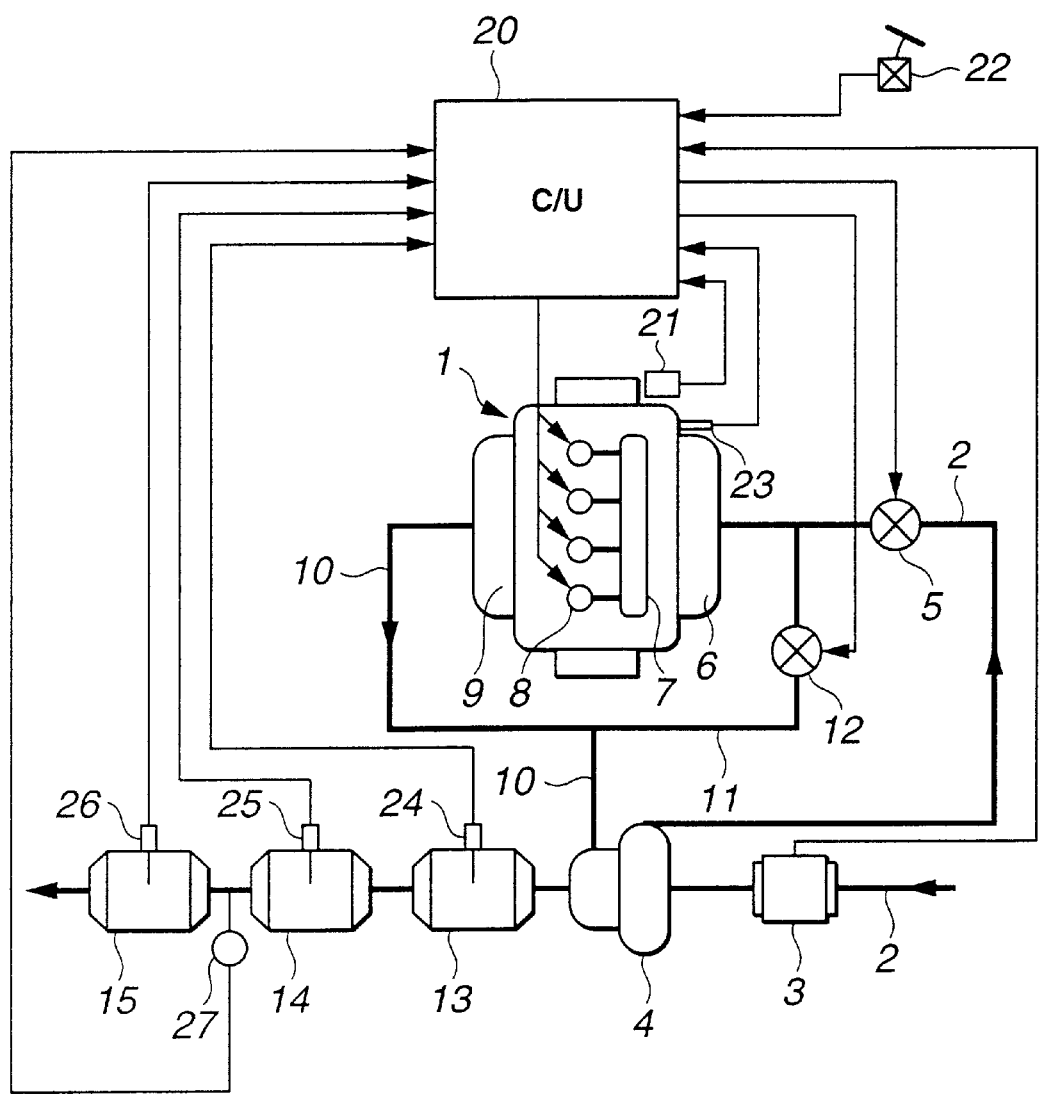
FIG. 1 is block diagram of an exhaust emission control system of a diesel engine, which is the present invention.

Referring to FIG. 1, there is shown schematically an exhaust emission control system of the present invention that is applied to a diesel engine 1.

The diesel engine 1 comprises an air intake passage 2 to which an air flow meter 3, a compressor part of a turbocharger 4 and a throttle valve 5 are mounted or connected. Throttle valve 5 is equipped with an electric actuator and driven by the same. A fresh air passing through these devices 3, 4 and 5 is led into each cylinder (or combustion chamber) through an intake manifold 6. Fuel compressed by a high pressure fuel pump (not shown) is led to a common rail 7 and directly injected into each combustion chamber through a corresponding fuel injection valve 8. Air and fuel thus led into each combustion chamber are mixed and burnt by means of a compressed self-ignition.

The diesel engine 1 further comprises an exhaust manifold 9 from which an exhaust gas passage 10 extends. Exhaust gas thus produced in each combustion chamber is led to exhaust gas passage 10 through exhaust manifold 9. As shown, for achieving an exhaust gas recirculation, part of the exhaust gas in exhaust gas passage 10 is returned back to air intake passage 2 through an EGR passage 11 and an EGR valve 12. EGR valve 12 is equipped with an electric actuator and driven by the same.

To exhaust gas passage 10, there are mounted or connected a turbine part of turbocharger 4, a three-way catalytic converter 13 with HC adsorption function, a NOx trapping catalytic converter 14 and a diesel particulate filter (DPF) 15 in order.

For ease of description, three-way catalytic converter 13 with HC adsorption function will be referred to as "HC adsorption type three-way catalytic converter" from the following.

Although both NOx trapping catalytic converter 14 and diesel particulate filter (DPF) 15 are mounted on exhaust gas passage 10, only one of them may be used in the present invention.

When the exhaust gas from engine 1 shows the excess air ratio "λ" of about 1 (that is, the exhaust gas shows a stoichiometric air/fuel ratio), HC adsorption type three-way catalytic converter 13 effectively purifies hydrocarbon (HC), carbon oxide (CO) and nitrogen oxide (NOx) in the exhaust gas.

The HC adsorption type three-way catalytic converter 13 has a HC adsorption member that adsorbs HC in the exhaust gas and releases the adsorbed HC into the exhaust gas in accordance with the temperature of the HC adsorption member. Thus, when the temperature of the exhaust gas is very low and thus HC adsorption type three-way catalytic converter 13 can not exhibit a satisfied HC purifying performance, the HC adsorption agent adsorbs HC in the exhaust gas.

When the exhaust gas shows a higher excess air ratio "λ" (that is, the exhaust gas shows a leaner air/fuel ratio), NOx trapping catalytic converter 14 traps NOx in the exhaust gas, while, when the exhaust gas shows a lower excess air ratio "λ" (that is, the exhaust gas shows a stoichiometric or richer air/fuel ratio), NOx trapping catalytic converter 14 releases the trapped NOx therefrom.

The diesel particulate filter (DPF) 15 functions to trap particulates in the exhaust gas from the engine 1.

As is shown in FIG. 1, in the present invention, at least one of diesel particulate filter (DPF) 15 and NOx trapping catalytic converter 14 is mounted on exhaust gas passage 10 and HC adsorption type three-way catalytic converter 13 is mounted on an upstream portion of exhaust gas passage 10 with respect to the devices 14 and 15. In the disclosed embodiment, the three-way catalytic converter 13 is constructed to have the HC adsorption agent section integrally mounted thereto. However, if desired, the HC adsorption agent section may be separated from three-way catalytic converter 13. In this case, the HC adsorption agent section is mounted at a position upstream of the converter 13.

The air flow meter 3 detects the amount of intake air "Qa" flowing in air intake passage 2. An engine speed sensor 21 and an accelerator sensor 22 are provided for detecting an engine speed "Ne" and an accelerator open degree "APO" respectively. A water temperature sensor 23 is further provided for detecting the temperature "TW" of engine cooling water.

Designated by numeral 20 is a control unit to which information signals are led from accelerator sensor 22, air flow meter 3, water temperature sensor 23 and engine speed sensor 21, as shown. The control unit 20 is a microcomputer that generally comprises a CPU (central processing unit), a RAM (random access memory), a ROM (read only memory), and input and output interfaces.

As shown, HC adsorption type three-way catalytic converter 13, NOx trapping catalytic converter 14 and diesel particulate filter (DPF) 15 have respective temperature sensors 24, 25 and 26 for detecting the temperature of their catalyst and filter beds. These temperature sensors 24, 25 and 26 may be of a thermocouple type. An exhaust gas pressure sensor 27 is further provided, which detects the exhaust gas pressure appearing just upstream of diesel particulate filter 15. Information signals from temperature sensors 24, 25 and 26 and exhaust gas pressure sensor 17 are also fed to control unit 20, as shown.

By processing the various information signals, control unit 20 issues various instruction signals to electric actuators of fuel injection valves 8, throttle valve 5 and EGR valve 12. That is, to the electric actuators of fuel injection valves 8, a fuel injection instruction signal is fed which represents a fuel injection amount and a fuel injection timing needed by each fuel injection valve 8. To the electric actuator of throttle valve 5, an open degree instruction signal is fed which represents an open degree needed by throttle valve 5, and to the electric actuator of EGR valve 12, an open degree instruction signal is fed which represents an open degree needed by EGR valve 12.

Due to employment of NOx trapping catalytic converter 14 and/or diesel particulate filter (DPF) 15, it is necessary to carry out a reactivation of them. That is, in case of NOx trapping catalytic converter 14, the reactivation is effected by removing S-poisoning from the catalyst, and in case of diesel particulate filter (DFP) 15, the reactivation is effected by removing the accumulated particulates (PM) from the filter.

In case of NOx trapping catalytic converter 14, judgment for the timing to carry out the reactivation is made based on a time for which converter 14 has practically worked. That is, when a predetermined time has passed from a previous reactivation of converter 14, it is judged that the converter 14 needs a next reactivation.

In case of diesel particulate filter (DPF) 15, judgment for the timing to carry out the reactivation is made based on an output of exhaust gas pressure sensor 27. That is, when the exhaust gas pressure exceeds a threshold value that is determined in accordance with an operation condition of the engine 1, it is judged that the filter 15 needs a next reactivation.

The reactivation of NOx trapping catalytic converter 14 and that of diesel particulate filter (DPF) 15 are carried out as follows.

In case of NOx trapping catalytic converter 14, the excess air ratio "λ" is lowered upon judgment of need of reactivation. With this action, the temperature of catalyst of the converter 14 is increased to a third predetermined degree (viz., about 600° C.). Thereafter, the temperature is maintained for a given time for releasing S-poisoning from the catalyst.

While, in case of diesel particulate filter (DPF) 15, the excess air ratio "λ" is lowered upon judgment of need of reactivation. With this action, the temperature of filter 15 is increased to the third predetermined degree (viz., about 600° C.). Thereafter, with the increased temperature being kept for a given time, the excess air ratio "λ" is raised for reactivating the filter 15.

As is described hereinabove, for starting the reactivation of NOx trapping catalytic converter 14 and/or diesel particulate filter (DPF) 15, increasing of the temperature of the catalyst 14 and/or filter 15 is made by lowering the excess air ratio "λ". This is because of a certain correlation established between the exhaust gas temperature and the excess air ratio "λ". That is, the exhaust gas temperature increases as the excess air ratio "λ" lowers.

Accordingly, in a normal operation, a target value of the excess air ratio "λ" (viz., target excess air ratio) is determined in accordance with an operation condition of the engine 1. While, under control for increasing the exhaust gas temperature, the excess air ratio "λ" is determined to a value (about 1 in the present invention) that is lower than the target excess air ratio determined in the normal operation.

Figure 2:
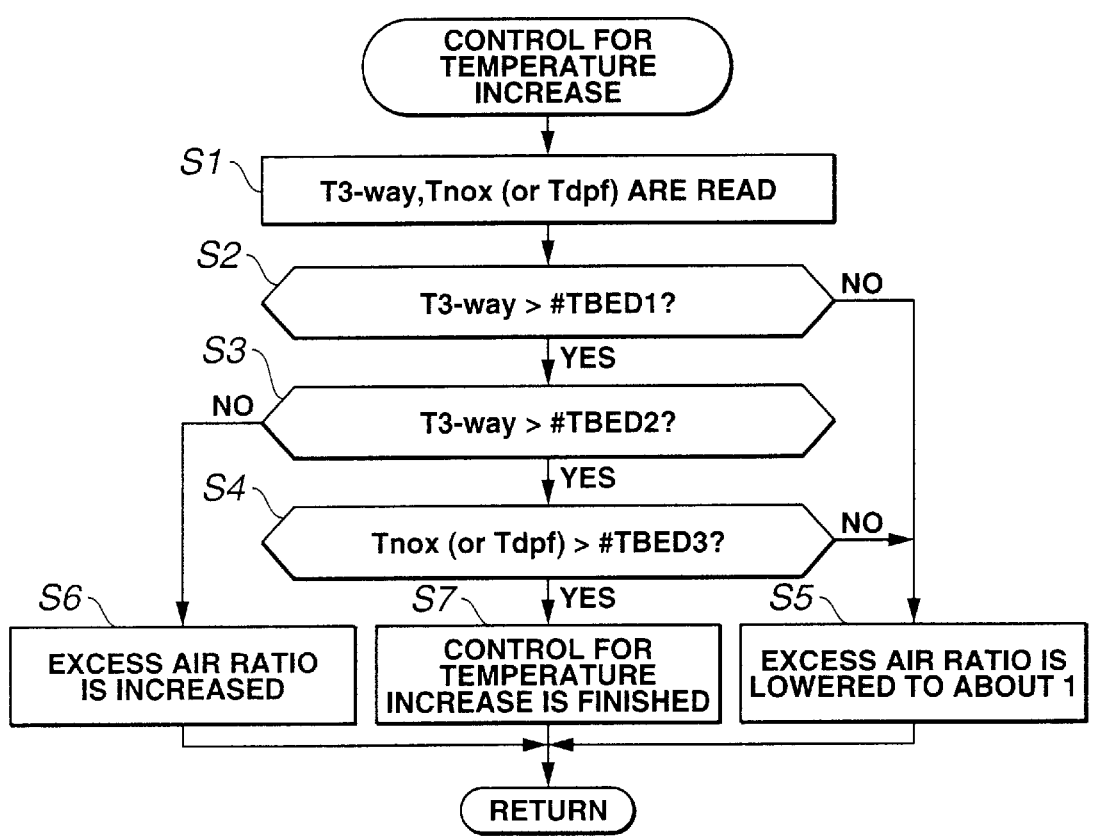
FIG. 2 is a flowchart showing programmed operation steps executed by a control unit for controlling the temperature increase of an exhaust gas purifying device.

Referring to FIG. 2, there is shown a flowchart that depicts programmed operation steps for controlling the temperature increase of NOx trapping catalytic converter 14 and/or diesel particulate filter (DPF) 15 to the third predetermined degree (viz., about 600° C.).

As will become apparent as the description proceeds, upon judgment of need of reactivation of the converter 14 or the filter (DPF) 15, the programmed operation steps of the flowchart are repeated until the needed temperature increase is completed.

At step S1, the temperature "T3-way" of HC adsorption type three-way catalytic converter 13, that "Tnox" of NOx trapping catalytic converter 14 and/or that "Tdpf" of diesel particulate filter (DPF) 15 are read. More specifically, the temperature of a catalyst bed or filter bed of such device 13, 14 and/or 15 is detected and read. Then, at step S2, judgment is carried out as to whether or not the temperature "T3-way" of HC adsorption type three-way catalytic converter 13 is higher than a first predetermined temperature "#TBED1" that is the oxidization activation temperature of converter 13. If YES, that is, when the temperature "T3-way" of converter 13 is higher than the first predetermined temperature "#TBED1", the operation step goes to step S3. While, if NO, that is, when the temperature "T3-way" of converter 13 is lower than or equal to the first predetermined temperature "#TBED1", the operation step goes to step S5.

Figure 3:
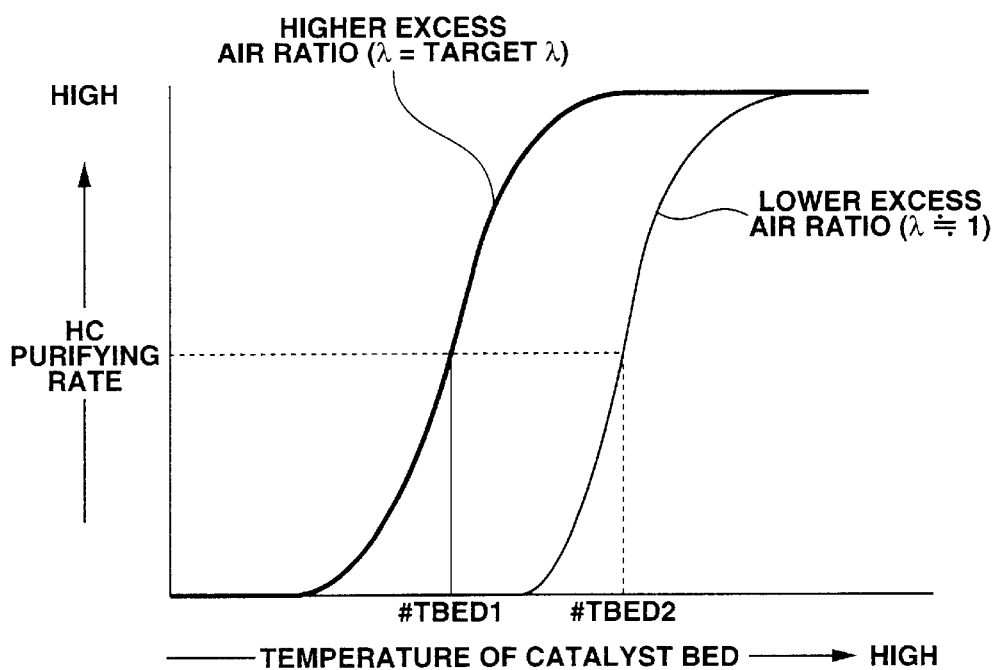
FIG. 3 is a graph showing a HC purifying performance of a three-way catalytic converter that possesses a HC adsorbing function.

As is seen from the graph of FIG. 3, the first predetermined temperature "#TBED1" is a temperature that allows three-way catalytic converter 13 to exhibit a HC purifying rate higher than a predetermined rate (for example 50%) when the excess air ratio "λ" of the exhaust gas led into converter 13 is relatively high (viz., the excess air ratio λ is the target value determined in accordance with the operation condition of engine 1), and allows three-way catalytic converter 13 to exhibit the HC purifying rate (0% in the illustrated example) lower than the predetermined rate (viz., 50%) when the excess air ratio "λ" of the exhaust gas led into converter 13 is relatively low (viz., λ is about 1). Thus, the first predetermined temperature "#TBED1" may be referred to as "an oxidization activation temperature" of HC adsorption type three-way catalytic converter 13.

As is seen from the graph of FIG. 3, the exhaust gas purifying performance of three-way catalytic converter 13 mainly depends on both the temperature of the catalyst bed of converter 13 and the excess air ratio "λ" of the exhaust gas led into converter 13, and the HC purifying function of the three-way purifying performance can be expected at a relatively low temperature by increasing the excess air ratio "λ" of the exhaust gas.

Referring back to the flowchart of FIG. 2, at step S3, judgment is carried out as to whether or not the temperature "T3-way" of HC adsorption type three-way catalytic converter 13 is higher than a second predetermined temperature "#TBED2" that is higher than the first predetermined temperature "#TBED1" and assures converter 13 of the three-way purifying performance. If YES, that is, when the temperature "T3-way" of converter 13 is higher than the second predetermined temperature "#TBED2", the operation step goes to step S4. While, if NO, that is, when the temperature "T3-way" of converter 13 is lower than or equal to the second predetermined temperature "#TBED2", the operation step goes to step S6.

Referring to the graph of FIG. 3 again, the second predetermined temperature "#TBED2" is a temperature that allows all the three components of three-way catalytic converter 13 to exhibit respective purifying rates higher than predetermined rates when the excess air ratio "λ" of the exhaust gas led into converter 13 is relatively low. Accordingly, the second predetermined temperature "#TBED2" may be referred to as "a three-way catalyst activation temperature" of HC adsorption type three-way catalytic converter 13.

Referring back to the flowchart of FIG. 2, at step S4, judgment is carried out as to whether or not the temperature "Tnox" of NOx trapping catalytic converter 14 or the temperature "Tdpf" of diesel particulate filter (DPF) 15 is higher than a third predetermined temperature "#TBED3", for example 600° C. that assures converter 14 or filter 15 of the reactivation.

That is, in case of reactivating NOx trapping catalytic converter 14, judgment is carried out as to whether the temperature "Tnox" of the catalyst bed of converter 14 is higher than the third predetermined temperature "#TBED3" or not. While, in case of reactivating diesel particulate filter (DPF) 15, judgment is carried out as to whether the temperature "Tdpf" of the filter bed of filter 15 is higher than the third predetermined temperature "#TBED3" or not. Thus, the third predetermined temperature "#TBED3" may be referred to as "reactivation assuring temperature" of converter 14 or filter 15. If YES at step S4, that is, when the temperature "Tnox" or "Tdpf" is higher than the third predetermined temperature "#TBED3", the operation flow goes to step S7. While, if NO at step S4, that is, when the temperature "Tnox" or "Tdpf" is lower than or equal to the third predetermined temperature "#TBED3", the operation flow goes to step S5.

Figure 4:
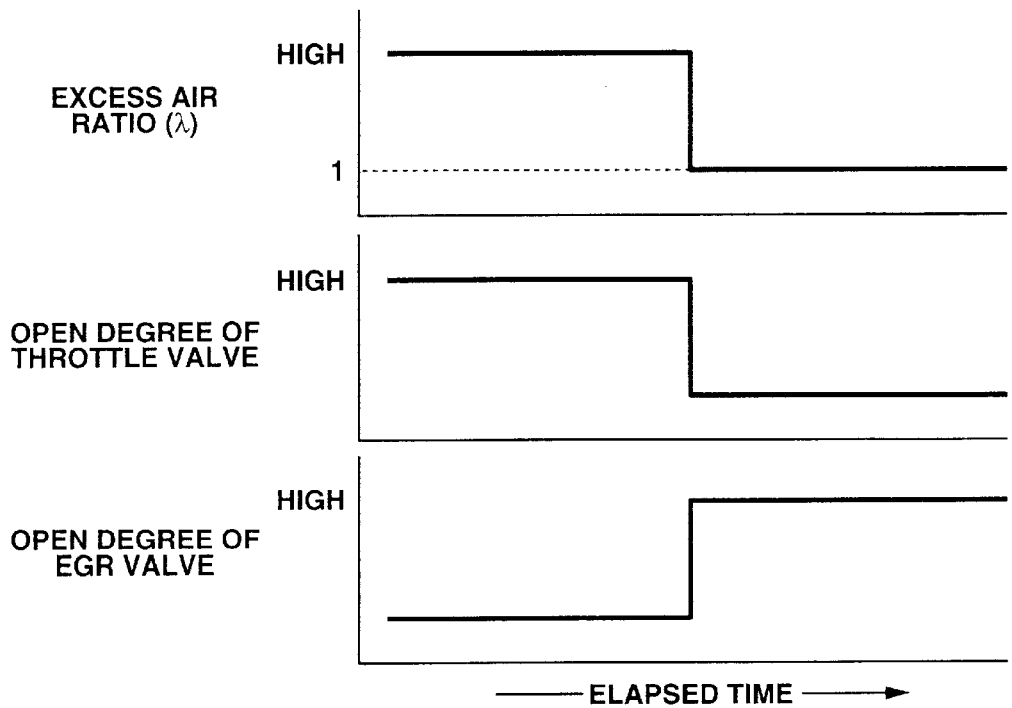
FIG. 4 is a time chart depicting operation of a throttle valve and that of an EGR valve with respect to an excess air ratio.

If NO at step S2, that is, when the temperature "T3-way" of HC adsorption type three-way catalytic converter 13 is lower than or equal to the first predetermined temperature "#TBED1" that is the oxidization activation temperature of converter 13, the operation flow goes to step S5. At this step S5, the excess air ratio "λ" is lowered to about 1 by operating throttle valve 5 and/or EGR valve 12. That is, as is seen from the graph of FIG. 4, by reducing the open degree of throttle valve 5, or increasing the open degree of EGR valve 12 or effecting the both operation, the excess air ratio "λ" is lowered to about 1.

Referring back to the flowchart of FIG. 2, if NO at step S3, that is, when the temperature "T3-way" of HC adsorption type three-way catalytic converter 13 is lower than or equal to the second predetermined temperature "#TBED2", the operation flow goes to step S6. At this step S6, the excess air ratio "λ" is increased by operating throttle valve 5 and/or EGR valve 12 in a reversed manner with respect to the operation manner at step S5. With this, the exhaust gas shows a leaner air/fuel ratio. At step S6, it is only necessary to increase the excess air ratio "λ". Thus, actually, the excess air ratio "λ" is controlled to the target excess air ratio that is set in the normal mode other than the exhaust gas temperature increasing mode and determined in accordance with an operation condition of engine 1. In fact, in such case, the exhaust gas shows its best quality with the target excess air ratio. If NO at step S4, that is, when the temperature "Tnox" of NOx trapping catalytic converter 14 or the temperature "Tdpf" of diesel particulate filter (DPF) 15 is lower than or equal to the third predetermined temperature "#TBED3", the operation flow goes to step S5 that has been described hereinabove. That is, at step S5, the excess air ratio "λ" is lowered to about 1. While, if YES at step S4, that is, when the temperature "Tnox" of NOx trapping catalytic converter 14 or the temperature "Tdpf" of diesel particulate filter (DPF) 15 is higher than the third predetermined temperature "#TBED3", the operation flow goes to step 57 and the control for temperature increase is finished. Thereafter, NOx trapping catalyst converter 14 and/or diesel particulate filter (DPF) 15 is subjected to the control for reactivation. In case of reactivation of converter 14, the excess air ratio "λ" is kept at about 1, while in case of reactivation of filter 15, the excess air ratio "λ" is increased.

In order to clarify the features of the present invention, description will be directed to a comparison between the system of the invention and the known system disclosed by the above-mentioned Laid-open Japanese Patent Application 7-189654.

In the known system, the temperature of a diesel particulate filter is increased to the reactivation assuring temperature by operating a throttle valve. For this temperature increase, two measures are used. One is to operate the throttle valve stepwise and the other is to operate the throttle valve continuously. With such first and second measures, in the temperature increase control, the excess air ratio is lowered stepwise and continuously, respectively.

These first and second measures will be briefly discussed with the aid of the time charts of FIGS. 5A to 5E and 6A to 6E, respectively.

In the first measure depicted by the time charts of FIGS. 5A to 5E, the excess air ratio is controlled stepwise. As is known in the art, under cold operation of diesel engines, the excess air ratio is set relatively high (viz., a leaner air/fuel ratio) as compared with that set under warmed-up operation wherein the engine is sufficiently warmed or heated.

Figure 5A:
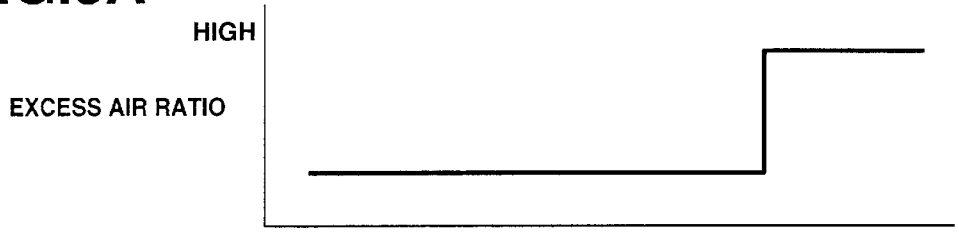
FIGS. 5A to 5E are time charts showing various data provided in case of a first measure of a related art.
Figure 5B:
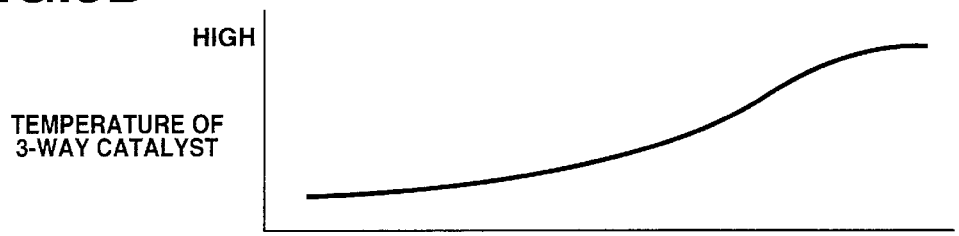
Figure 5C:
Figure 5D:
Figure 5E:
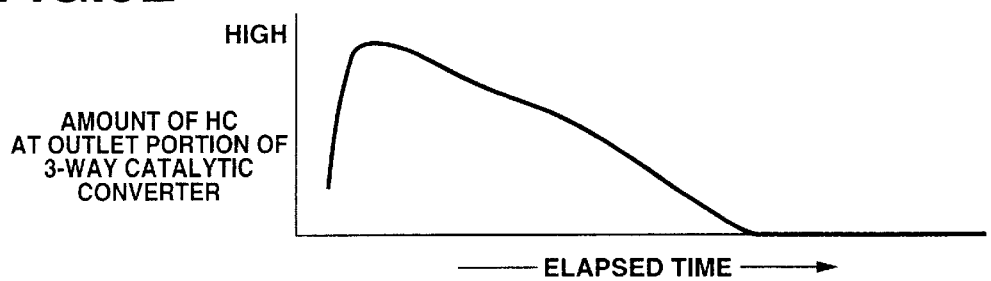

As is seen from FIGS. 5A, 5B and 5C, when the excess air ratio shows a low value, the exhaust gas temperature is increased. With this, not only heating of a three-way catalytic converter but also heating of a diesel particulate filter or NOx trapping catalytic converter is speeded up as compared with a normal operation of the engine. Thus, when, under cold operation of the engine, it becomes necessary to carry out reactivation of the diesel particulate filter or NOx trapping catalytic converter, the excess air ratio is lowered.

However, during the temperature increasing process, the exhaust gas is forced to contain a larger amount of hydrocarbon (HC). That is, because of lowering of the excess air ratio, the engine is forced to produce a larger amount of HC. This undesired phenomenon will be well understood from FIG. 5D. Furthermore, since the engine is forced to keep its operation with such a lower excess air ratio, the three-way catalytic converter fails to exhibit a satisfied oxidization function due to lack of oxygen in the exhaust gas. Thus, the three-way catalytic converter is forced to pass a larger amount of HC therethrough for a certain time, as is understood from FIG. 5E.

Figure 6A:
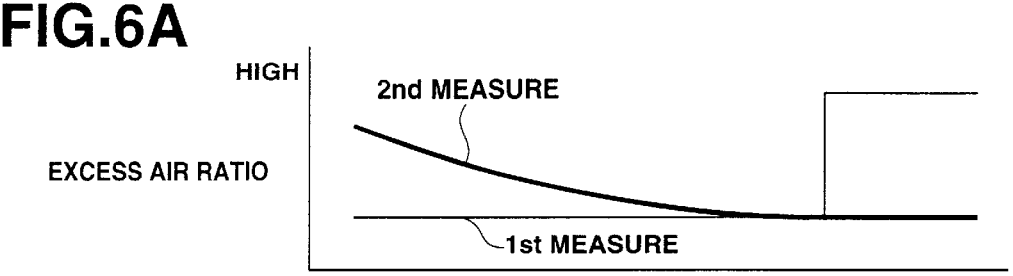
FIGS. 6A to 6E are time charts showing various data provided in case of a second measure of the related art.
Figure 6B:
Figure 6C:
Figure 6D:
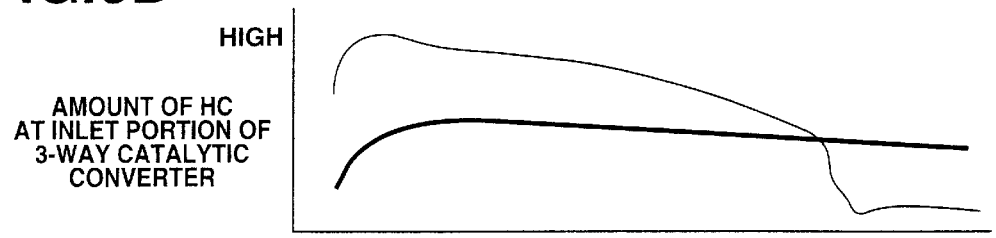
Figure 6E:
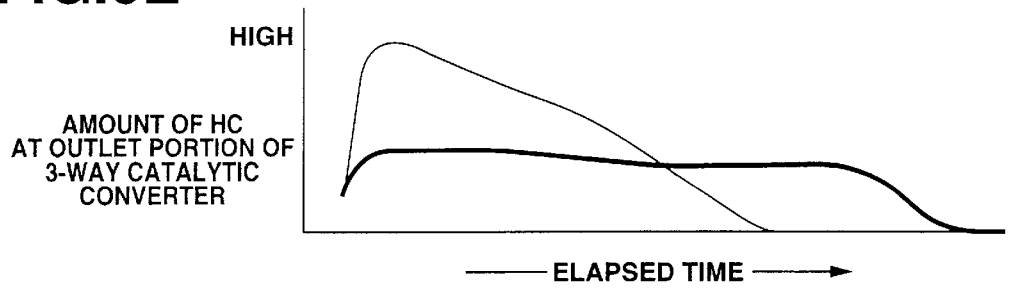

In the second measure depicted by the time charts of FIGS. 6A to 6E, the excess air ratio is controlled continuously as is seen from FIG. 6A. It is to be noted that data curves provided by this second measure are illustrated by thicker lines. For comparison, the data curves provided by the above-mentioned first measure are also shown in the time charts, which are illustrated by thinner lines.

In the second measure, because, as is seen from FIG. 6A, the excess air ratio is totally high as compared with the rate that is provided in the above-mentioned first measure wherein the engine operation is kept with a lower excess air ratio. Thus, in the second measure, the amount of HC discharged by the engine can be reduced as compared with the first measure, as is seen from FIG. 6D. However, because of usage of the higher excess air ratio, temperature increase of the exhaust gas is not speeded up, and thus, as compared with the case of the first measure, not only heating of the three-way catalytic converter but also heating of the diesel particulate filter or NOx trapping catalytic converter is delayed, as is seen from FIGS. 6B and 6C.

As will become apparent as the description proceeds, the present invention is provided by paying attention to the temperature characteristic of the HC adsorption type three-way catalytic converter that is shown in the graph of FIG. 3. As is seen from this graph, the three-way catalytic converter has different temperature characteristics between the HC purifying performance exhibited when the excess air ratio is high (viz., leaner air/fuel ratio) and the performance exhibited when the excess air ratio is low (viz., richer air/fuel ratio). That is, when the excess air ratio is high (viz., leaner air/fuel ratio), the practical oxidization activation of the three-way catalytic converter appears early.

In the followings, the features of the present invention will be described with reference to the time charts of FIGS. 7A to 7E. It is to be noted that date curves provided by the invention are illustrated by thicker lines. For comparison, the data curves provided the above-mentioned first known measure are also shown in the time charts, which are illustrated by thinner lines.

As is seen from FIGS. 7A and 7B, during cold operation of engine 1, that is, until the time when the catalyst bed of HC adsorption type three-way catalytic converter 13 shows the oxidization activation temperature (viz., #TBED1), the excess air ratio is kept low, that is, about 1. Until this, the exhaust gas from the engine 1 is forced to contain a larger amount of HC. However, such HC is adsorbed temporarily by the three-way catalyst of converter 13 due to the HC adsorption performance possessed by the same.

Upon reaching the oxidization activation temperature (viz., #TBED1) by the catalyst bed of HC adsorption type three-way catalytic converter 13, the excess air ratio is shifted from the lower side (viz., about 1) to a higher side (viz., leaner side). Upon this, the exhaust gas led into three-way catalytic converter 13 is changed to show an oxygen richer property, and at the same time, the hydrocarbon adsorbed by the three-way catalyst of converter 13 under the cold operation is burnt (or oxidized) and thus purified. Due to burning (viz., oxidization) of the hydrocarbon which produces a certain heat, the temperature of the catalyst bed of converter 13 is increased sharply as is seen from FIG. 7B. As is seen from FIG. 7C, due to the heat produced by the oxidization of the hydrocarbon, the exhaust gas discharged from HC adsorption type three-way catalytic converter 13 has a higher temperature and thus the catalyst bed of NOx trapping catalytic converter 14 and/or the filter bed of diesel particulate filter (DPF) 15, which is arranged downstream of the converter 13, is sufficiently heated. Furthermore, as is seen from FIGS. 7A and 7D, when the excess air ratio is kept high (viz., leaner air/fuel ratio), the exhaust gas emitted from engine 1 shows a less amount of hydrocarbon.

When, thereafter, the catalyst bed of converter 13 shows the three-way catalyst activation temperature "#TBED2", the excess air ratio is shifted from the higher side to the lower side (about 1) again, as is seen from FIGS. 7A and 7B. Under the condition wherein the excess air ratio is kept about 1, the exhaust gas from engine 1 shows the highest temperature and thus the temperature of the catalyst of converter 13 is instantly increased. In addition to this, since the three-way catalyst activation temperature "#TBED2" has been obtained under this condition, the exhaust gas (viz., HC) can be sufficiently purified by the three-way catalyst even though the excess air ratio is lowered to about 1, as is seen from FIG. 7E.

As is understood from the foregoing description, in the present invention, in the process of raising the temperature of the catalyst of the HC adsorption type three-way catalytic converter 13, the excess air ratio is raised once for the purpose of inducing an oxidization of hydrocarbon adsorbed by the catalyst. By a certain heat produced by the oxidization of the hydrocarbon, raising of the temperature of the catalyst of converter 13 is instantly carried out as compared with the above-mentioned first and second measures. Furthermore, due to raising of the excess air ratio for once, the exhaust emission from engine 1 is improved as is seen from FIG. 7D.

The entire contents of Japanese Patent Application 2002-092459 filed Mar. 28, 2002 are incorporated herein by reference.

Although the invention has been described above with reference to the embodiment of the invention, the invention is not limited to such embodiment as described above. Various modifications and variations of such embodiment may be carried out by those skilled in the art, in light of the above description.

What is claimed is:

1. An exhaust emission control system of a diesel engine, comprising:

an exhaust gas purifying device arranged in an exhaust gas passage extending from the engine, the exhaust gas purifying device having at least one of two functions, one function being a function of trapping particulate matter (PM) of the exhaust gas flowing in the exhaust gas passage and the other function being a function of trapping nitrogen oxides (NOx) in the exhaust gas when the exhaust gas shows a higher excess air ratio and reducing the trapped nitrogen oxides (NOx) to purify the same when the exhaust gas shows a lower excess air ratio;

a three-way catalytic converter arranged in the exhaust gas passage upstream of the exhaust gas purifying device, the converter purifying hydrocarbon (HC), carbon monoxide (CO) and nitrogen oxides (NOx) in the exhaust gas when the excess air ratio of the exhaust gas is approximately 1 (one);

a hydrocarbon adsorbing/releasing member arranged in the exhaust gas passage upstream of the three-way catalytic converter, the member selectively adsorbing thereon hydrocarbon in the exhaust gas and releasing the adsorbed hydrocarbon into the exhaust gas in accordance with a temperature of a catalyst bed of the three-way catalytic converter; and a control unit which is configured to carry out, upon need of reactivation of the exhaust gas purifying device under cold operation of the engine, lowering the excess air ratio of the exhaust gas when the temperature of the catalyst bed of the three-way catalytic converter is lower than or equal to a first predetermined temperature;

raising the excess air ratio of the exhaust gas when the temperature of the catalyst bed of the three-way catalytic converter is higher than the first predetermined temperature but lower than or equal to a second predetermined temperature; and lowering the excess air ratio of the exhaust gas until the temperature of the exhaust gas purifying device becomes to a third predetermined temperature when the temperature of the catalyst bed of the three-way catalytic converter is higher than the second predetermined temperature.

2. An exhaust emission control system as claimed in claim 1, in which the first predetermined temperature is a temperature that allows the three-way catalytic converter to exhibit a HC purifying rate higher than a predetermined rate when the excess air ratio of the exhaust gas led into the three-way catalytic converter is relatively high and allows the three-way catalytic converter to exhibit the HC purifying rate lower than the predetermined rate when the excess air ratio of the exhaust gas led into the three-way catalytic converter is relatively low.

3. An exhaust emission control system as claimed in claim 2, in which the control unit is configured to set a target excess air ratio of the exhaust gas that varies in accordance with an operation condition of the diesel engine, in which the control unit is configured to control the excess air ratio of the exhaust gas led into the three-way catalytic converter to the target excess air ratio when the temperature of the catalyst bed of the three-way catalytic converter is higher than the first predetermined temperature but lower than or equal to the second predetermined temperature, and in which the first predetermined temperature is a temperature that allows the three-way catalytic converter to exhibit the HC purifying rate higher than the predetermined rate when the excess air ratio of the exhaust gas is the target excess air ratio.

4. An exhaust emission control system as claimed in claim 1, in which the second predetermined temperature is a temperature that allows all of the three purifying components of the three-way catalytic converter to exhibit respective purifying rates higher than respective predetermined rates when the excess air ratio of the exhaust gas led into the three-way catalytic converter is relatively low.

5. An exhaust emission control system as claimed in claim 1, in which the third predetermined temperature is a temperature that assures a reactivation of the exhaust gas purifying device.

6. An exhaust emission control system as claimed in claim 1, in which the control unit is configured to control the excess air ratio of the exhaust gas led into the three-way catalytic converter to approximately 1 (one) When the temperature of the catalyst bed of the three-way catalytic converter is higher than the second predetermined temperature but lower than or equal to the third predetermined temperature.

7. An exhaust emission control system as claimed in claim 1, in which the hydrocarbon adsorbing/releasing member is integral with the three-way catalytic converter.

8. An exhaust emission control system as claimed in claim 1, in which the control unit is configured to control an open degree of a throttle valve that varies the amount of air fed to each cylinder of the diesel engine.

9. An exhaust emission control system as claimed in claim 1, in which the control unit is configured to control an open degree of an EGR valve that leads part of the exhaust gas to each cylinder of the engine.

10. In an exhaust emission control system of a diesel engine, comprising an exhaust gas purifying device arranged in an exhaust gas passage extending from the engine, the exhaust gas purifying device having at least one of two functions, one function being a function of trapping particulate matter (PM) of the exhaust gas flowing in the exhaust gas passage and the other function being a function of trapping nitrogen oxides (NOx) in the exhaust gas when the exhaust gas shows a higher excess air ratio and reducing the trapped nitrogen oxides (NOx) to purify the same when the exhaust gas shows a lower excess air ratio; a three-way catalytic converter arranged in the exhaust gas passage upstream of the exhaust gas purifying device, the converter purifying hydrocarbon (HC), carbon monoxide (CO) and nitrogen oxides (NOx) in the exhaust gas when the excess air ratio of the exhaust gas is approximately 1 (one); and a hydrocarbon adsorbing/releasing member arranged in the exhaust gas passage upstream of the three-way catalytic converter, the member selectively adsorbing thereon hydrocarbon in the exhaust gas and releasing the adsorbed hydrocarbon into the exhaust gas in accordance with a temperature of a catalyst bed of the three-way catalytic converter, a method of controlling the exhaust emission control system, upon need of reactivation of the exhaust gas purifying device under cold operation of the engine, comprising:

lowering the excess air ratio of the exhaust gas when the temperature of the catalyst bed of the three-way catalytic converter is lower than or equal to a first predetermined temperature;

raising the excess air ratio of the exhaust gas when the temperature of the catalyst bed of the three-way catalytic converter is higher than the first predetermined temperature but lower than or equal to a second predetermined temperature; and lowering the excess air ratio of the exhaust gas until the temperature of the exhaust gas purifying device becomes to a third predetermined temperature when the temperature of the catalyst bed of the three-way catalytic converter is higher than the second predetermined temperature.

* * * * *